US008346568B1

(12) United States Patent
Del Favero et al.

(10) Patent No.: US 8,346,568 B1
(45) Date of Patent: Jan. 1, 2013

(54) METHOD AND SYSTEM FOR PREDICTIVE BILL ESTIMATION BASED ON FINANCIAL DATA FROM SIMILAR USERS

(75) Inventors: James Robert Del Favero, Mountain View, CA (US); Marko Rukonic, San Jose, CA (US); Chris Lee, San Francisco, CA (US); Benjamin Weiss, Portola Valley, CA (US); John Reed Flora, Pleasanton, CA (US)

(73) Assignee: Intuit Inc., Mountain View, CA (US)

( * ) Notice: Subject to any disclaimer, the term of this patent is extended or adjusted under 35 U.S.C. 154(b) by 880 days.

(21) Appl. No.: 12/022,597

(22) Filed: Jan. 30, 2008

(51) Int. Cl.
*G06Q 40/00* (2012.01)
(52) U.S. Cl. .......................................... 705/1.1; 705/35
(58) Field of Classification Search ................... 705/35, 705/1
See application file for complete search history.

(56) References Cited

U.S. PATENT DOCUMENTS

| | | | | |
|---|---|---|---|---|
| 7,693,771 | B1 * | 4/2010 | Zimmerman et al. | 705/36 R |
| 7,877,402 | B1 * | 1/2011 | Weiss et al. | 707/759 |
| 2003/0061132 | A1 * | 3/2003 | Yu et al. | 705/30 |
| 2005/0283434 | A1 * | 12/2005 | Hahn-Carlson et al. | 705/39 |
| 2008/0288312 | A1 * | 11/2008 | Miles et al. | 705/7 |

OTHER PUBLICATIONS

Courant, H. (Apr. 22, 1994). Program makes checkbook balancing easy. Orlando Sentinel, pp. 2-E2. Retrieved Sep. 24, 2012.*

* cited by examiner

*Primary Examiner* — Kito R Robinson
(74) *Attorney, Agent, or Firm* — McKay and Hodgson, LLP; Philip McKay; Sean P. Lewis

(57) ABSTRACT

A system and method for predictive bill estimation includes a process for predictive bill estimation whereby financial data associated with one or more "contributing consumers" is obtained from one or more sources. The financial data obtained from the one or more contributing consumers is then aggregated, analyzed, and/or categorized, according to one or more criteria/parameters associated with the financial transaction data and/or the contributing consumer. The aggregated and/or categorized financial data is then stored. A user consumer then initiates a request for cost/bill data associated with a given area and/or event. The aggregated and/or categorized financial data obtained from one or more contributing consumers is then searched based on one or more search parameters and results data representing multiple financial transactions and/or purchases associated the specified area and/or event is obtained. The results data obtained is then presented to the user consumer in any one of various data and/or report formats, and the user consumer may be notified/alerted to predicted fluctuations in his or her bills automatically well in advance of the expected fluctuation in order to provide the user consumer the opportunity to budget for the predicted fluctuations.

25 Claims, 2 Drawing Sheets

METHOD AND SYSTEM FOR PREDICTIVE BILL ESTIMATION BASED ON FINANCIAL DATA FROM SIMILAR USERS

BACKGROUND

It is often very important for consumers to determine, well in advance, what bills they are likely to be responsible for, and any fluctuations that may occur in recurring bills over a period of time. This is obviously true for budgeting purposes, but it is also true when trying to make life and/or purchase decisions, such as a change of residence or whether a given product and/or service should be purchased and/or what features of a given product and/or service are most important.

A consumer who has lived in a given area for a significant length of time, and/or whose personal and financial situation is relatively static, generally knows what bills to expect, and what fluctuations are likely to occur in their bills. Consequently, these static consumers are less likely to be caught off guard by hidden costs and/or changes in bill amounts. However, the reality for many Americans is that changes of residence and/or financial situation are inevitable, and often beyond the control of the consumer. Consequently, for many Americans, when they do move and/or change their financial status, determining what bills associated with the change are likely to come up, and/or what fluctuations in a given bill are likely, is a relatively difficult task, and is often not recognized as an issue until the change is made and the bill is due.

For instance, a given consumer may have recently moved to a new state, or may be contemplating a move, or may be buying a home for the first time in a given area. In these cases, the consumer can probably accurately determine the cost of housing in the new state/residence, at least the direct cost of the house or rent in the new location. The consumer can probably also fairly accurately determine the cost of food and perhaps clothing in the new location. However, in many cases there are hidden costs/bills associated with the move/change that the consumer may not be able to identify so readily, such as property taxes, seasonal bill fluctuations, services associated with the change, etc.

As an example, a consumer moving, or considering a move, from a mild climate, like Los Angeles, Calif., to the Mid-West, say Chicago, Ill., may not truly appreciate how much it will cost to heat a house in the winter in the Mid-West and the corresponding increase in utility bills during the Fall and Winter months may be a real surprise to the consumer. In addition, the consumer may not even be aware that in colder climates there are additional costs/bills that simply don't occur in L.A., such as driveway snow clearing services, weather related house repair, and emergency supplies such as generators and heating. In addition, there may be significant differences in property tax, sales tax, and other tax structures between the two locations, as well as differences in services used and costs incurred. As another example, in L.A. there is little difference between a winter wardrobe and a summer wardrobe, and often a single multi-seasonal wardrobe will suffice. However, in Chicago, the average person literally needs at least two separate wardrobes; one for Fall/Winter; and one for Spring/Summer, neither of which being of particular use outside its respective season(s) of use. This could be a real surprise to the consumer moving from L.A. who did not anticipate the cost of winter clothing.

As another example, a consumer buying a house for the first time may be unaware of numerous bills/costs associated with home ownership either in general, or associated with a given area such as, but not limited to: trash service; property taxes; sewer service; gardener service; and various utilities and maintenance costs and/or how these cost fluctuate according to season from month-to-month.

In short, a consumer making a move could quite easily be caught off-guard by unexpected bills and/or unexpected fluctuations in recurring bills and, as a result, have their budgets negated and finances put into disarray.

As a result of the situation described above, it is currently quite difficult to determine the actual total cost of living associated with a change of residence and/or change in financial situation, both in terms of identifying all likely bills, and in terms of anticipating fluctuations in recurring/anticipated bills. Consequently, many consumers are faced with unexpected costs/bills, and many carefully prepared budgets are negated by these unexpected costs/bills. This can cause significant consumer stress and have a direct effect on the consumer's satisfaction with the move and/or a purchase of a product and/or service in, and/or for use in, the new location.

SUMMARY

In accordance with one embodiment, a system and method for predictive bill estimation includes a process for predictive bill estimation whereby financial data associated with one or more "contributing consumers" is obtained from one or more sources. In one embodiment, the contributing consumers agree to share the financial data with other "user consumers". In one embodiment, the financial data includes data associated with specific financial transactions and, in one embodiment, the specific financial transactions are tagged as sharable by the contributing consumers. In one embodiment, the financial data is categorized by the contributing consumers and, in one embodiment, multiple financial transactions are associated with a specific expense category by the contributing consumers. In one embodiment, the financial data obtained from the one or more contributing consumers is then aggregated, analyzed, and/or categorized, according to one or more criteria/parameters associated with the financial transaction data and/or the contributing consumer. In one embodiment, the aggregated and/or categorized financial data is then stored by the process for predictive bill estimation. In one embodiment, a user consumer then initiates a request for cost/bill data associated with a given area and/or event. In one embodiment, the aggregated and/or categorized financial data obtained from one or more contributing consumers is then searched based on one or more search parameters and results data representing multiple financial transactions and/or purchases associated the specified area and/or event and/or time frame is obtained. In one embodiment, the results data obtained is then presented to the user consumer in any one of various data and/or report formats, and, in one embodiment, the user consumer is notified/alerted to predicted fluctuations in his or her bills automatically well in advance of the expected fluctuation in order to provide the user consumer the opportunity to budget for the predicted fluctuations.

In one embodiment, the financial data obtained from one or more contributing consumers is general financial data representing a given contributing consumer's general and/or overall financial status and/or demographics, including, but not limited to: the contributing consumer's area of residence/zip code; the contributing consumer's total assets; details regarding one or more of the contributing consumer's assets, such as the size and location of the contributing consumer's house; the contributing consumer's total liabilities/debt; the contributing consumer's net worth; the contributing consumer's average discretionary spending; details regarding the contributing consumer's spending habits and monthly/recurring expenses; the contributing consumer's age group; various demographic data regarding the contributing consumer and/or the contributing consumer's spending; the contributing consumer's marital status and/or number of dependents; the contributing consumer's commute; and/or any other data regarding the contributing consumer's general and/or overall financial status desired and/or available. In one embodiment, as discussed below, the contributing consumer's general and/or overall financial status and/or demographics data is used to categorize and/or identify contributing consumers, and their financial data, according to various criteria so contributing consumer's most like a given user consumer can be identified and/or a user consumer can narrow search results to results from specific "types" of contributing consumers.

In one embodiment, the financial data for one or more contributing consumers includes data regarding specific financial transactions conducted by the contributing consumer including, but not limited to: dates of specific financial transactions; payees/payers associated with specific financial transactions; categories of specific financial transactions; total expenditures in specific financial transaction categories over designated time frames; specific items purchased through specific financial transactions; and/or any other data regarding specific financial transactions desired and/or available, and designated as sharable by the contributing consumer.

In one embodiment, the financial data for one or more contributing consumers is obtained from one or more computing system implemented financial management systems as defined herein, and/or as known in the art the time of filing, and/or as developed after the time of filing.

In one embodiment, the contributing consumers agree to share the financial data with user consumers on a transaction-by-transaction approval basis. In one embodiment, the contributing consumers agree to share the financial data with user consumers on a transaction category approval basis. In one embodiment, the contributing consumers agree to share the financial data with user consumers without restriction. In other embodiments, the contributing consumers agree to share the financial data with user consumers based on any restrictions/criteria defined by the contributing consumer.

In one embodiment, the financial data to be shared is tagged as sharable by the contributing consumers using a user interface display and a user interface device, such as those defined herein, known in the art, or developed after the time of filing.

In one embodiment, specific financial transaction data is categorized by the contributing consumer and one or more specific financial transactions are associated by the contributing consumer with a specific category, such as utilities, or clothing, or car/gas.

In one embodiment, the financial data obtained from one or more contributing consumers is aggregated according to the category associated with the financial data and one or more parameters associated with the contributing consumer such as, but not limited to: the contributing consumer's area of residence/zip code; the contributing consumer's total assets; details regarding one or more of the contributing consumer's assets, such as the size and location of the contributing consumer's house and/or the type of car the contributing consumer drives; the contributing consumer's total income and/or the percentage of the contributing consumer's income spent in the category of the financial transaction data; the contributing consumer's net worth; the contributing consumer's average discretionary spending and/or the percentage of the contributing consumer's discretionary spending spent in the category of the financial transaction data; the contributing consumer's age group; various demographic data regarding the contributing consumer and/or the contributing consumer's spending; the contributing consumer's marital status and/or number of dependents; the contributing consumer's commute and/or profession; and/or any other data regarding the contributing consumer's general and/or overall financial status desired and/or available.

In one embodiment, the financial data obtained from one or more contributing consumers is aggregated according to categorizations and/or re-categorizations, and/or groupings, of the financial data determined by the process for predictive bill estimation.

In one embodiment the contributing consumer financial data is then stored by, or under the control of, the process for predictive bill estimation in a database, as defined herein, known in the art at the time of filing, or as developed after the time of filing.

In one embodiment, a user consumer initiates a request for cost/bill data associated with a given area and/or event using a user interface display and a user interface device. In one embodiment, the user consumer provides other search parameters and/or criteria, such as a request to see all results from specific categories of contributing consumers or from contributing consumers having specific financial and/or demographic attributes.

In one embodiment, the financial data obtained from one or more contributing consumers is then searched and search results data associated with the given area and/or event, and/or most closely matching any user consumer search parameters and/or criteria, is gathered. In one embodiment, the search results data includes data representing all financial transactions, and therefore all bills and/or bill payments, associated with the given area and/or event of the user consumer initiated search request.

In one embodiment, the search results data associated with given area and/or event, and/or most closely matching any user consumer search parameters and/or criteria, is then presented to the user consumer in any one of various data and/or report formats.

In one embodiment, the user consumer is shown a listing of specific bills paid by the one or more contributor consumers associated with the given area and/or event of the user consumer initiated search request. In one embodiment, the user consumer is shown a listing of costs in specific categories paid by the one or more contributor consumers associated with the given area and/or event of the user consumer initiated search request. In this way, a user consumer can potentially see all bills, including bills associated with potentially hidden costs the user consumer was not aware of.

In one embodiment, the user consumer is shown a listing of specific bills associated with the given area and/or event of the user consumer initiated search request in a month-to-month comparison. In one embodiment, the user consumer is shown a listing of costs in specific categories paid by the one or more contributor consumers in a month-to-month comparison. In this way a user consumer can see all bills, including bills associated with potentially hidden costs the user consumer was not aware of, and potential monthly and/or seasonal fluctuations in those bills.

In one embodiment, the user consumer is shown results and/or alerted to potential upcoming bills and/or bill fluctuations manually in response to a specific user consumer request. In one embodiment, the user consumer is shown results and/or alerted to potential upcoming bills and/or bill fluctuations, semi-automatically or automatically on a periodic basis. In one embodiment, the user consumer is shown results and/or alerted to potential upcoming bills and/or bill fluctuations, automatically on a periodic basis well in advance of the predicted bills and/or bill fluctuations in order to provide the user consumer the opportunity to budget for the predicted fluctuations.

Using the system and method for predictive bill estimation disclosed herein, a user consumer is provided the opportunity to see financial data associated with other consumer's and, in particular, see what bills and bill amounts are being paid by similarly situated consumers. Consequently, using the system and method for predictive bill estimation disclosed herein, a consumer can learn from the experience of similarly situated consumers and thereby more readily determine the actual bills, and amount of those bills, that are associated with a given location and/or event. Therefore, using the system and method for predictive bill estimation disclosed herein, the consumer is far less likely to be faced with unexpected costs associated with a move and/or financial event.

Figure 1:
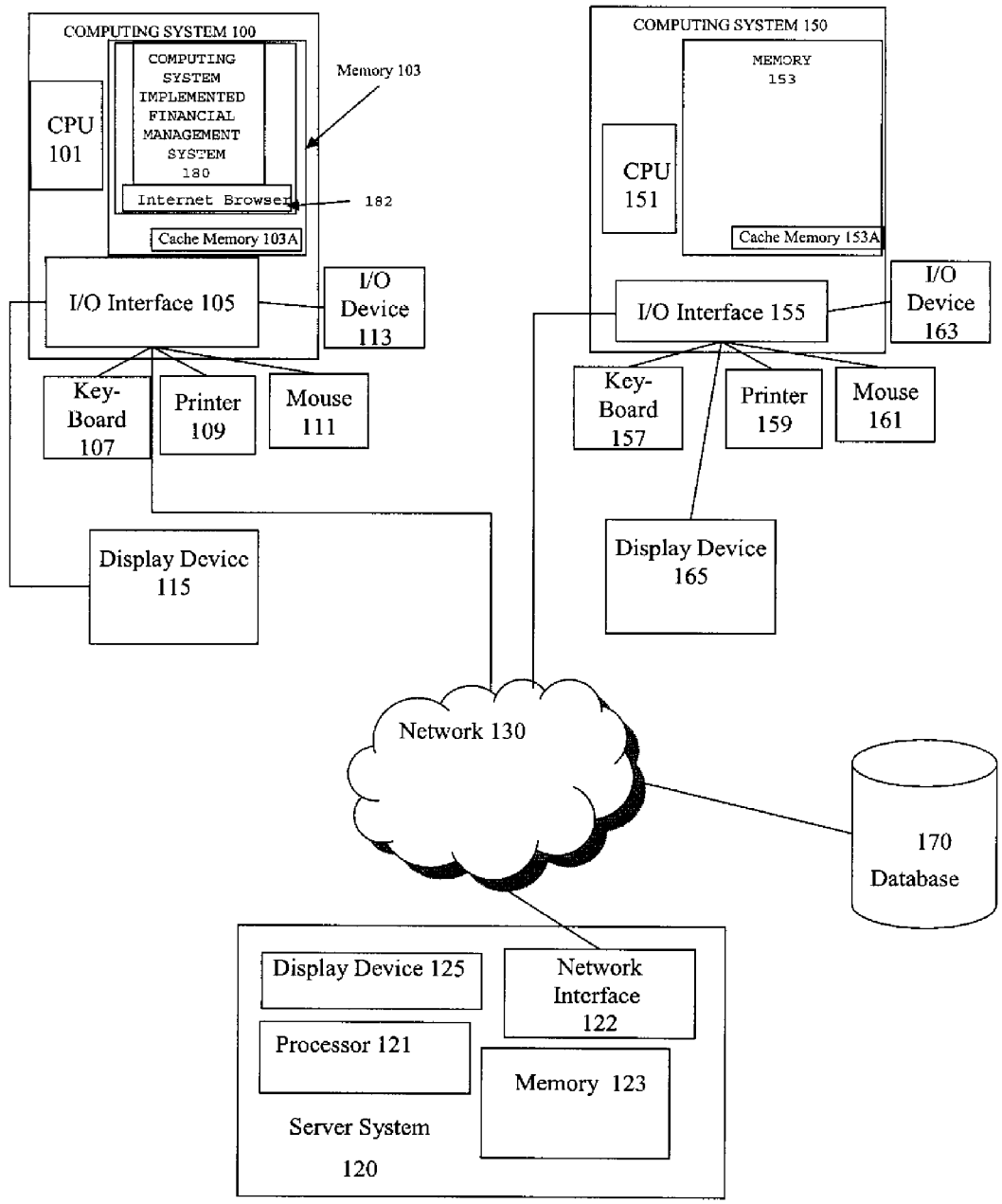
FIG. 1 is a block diagram of an exemplary hardware architecture for implementing one embodiment.

Common reference numerals are used throughout the FIG. s and the detailed description to indicate like elements. One skilled in the art will readily recognize that the above FIG. s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG. s, which depict one or more exemplary embodiments. Embodiments may be embodied in many different forms and should not be construed as limited to the embodiments set forth herein, shown in the FIG. s, and/or described below. Rather, these exemplary embodiments are provided to allow a complete disclosure that conveys the principles of the invention, as set forth in the claims, to those of skill in the art.

In accordance with one embodiment, a system and method for predictive bill estimation includes a process for predictive bill estimation whereby financial data associated with one or more "contributing consumers" is obtained from one or more sources. In one embodiment, the contributing consumers agree to share the financial data with other "user consumers". In one embodiment, the financial data includes data associated with specific financial transactions and, in one embodiment, the specific financial transactions are tagged as sharable by the contributing consumers. In one embodiment, the financial data is categorized by the contributing consumers and, in one embodiment, multiple financial transactions are associated with a specific expense category by the contributing consumers. In one embodiment, the financial data obtained from the one or more contributing consumers is then aggregated, analyzed, and/or categorized, according to one or more criteria/parameters associated with the financial transaction data and/or the contributing consumer. In one embodiment, the aggregated and/or categorized financial data is then stored by the process for predictive bill estimation. In one embodiment, a user consumer then initiates a request for cost/bill data associated with a given area and/or event. In one embodiment, the aggregated and/or categorized financial data obtained from one or more contributing consumers is then searched based on one or more search parameters and results data representing multiple financial transactions and/or purchases associated the specified area and/or event and/or time frame is obtained. In one embodiment, the results data obtained is then presented to the user consumer in any one of various data and/or report formats, and, in one embodiment, the user consumer is notified/alerted to predicted fluctuations in his or her bills automatically well in advance of the expected fluctuation in order to provide the user consumer the opportunity to budget for the predicted fluctuations.

Hardware System Architecture

FIG. 1 is a block diagram of an exemplary hardware architecture for implementing one embodiment of a system and method for predictive bill estimation, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as any computing system implemented financial management system defined herein, known in the art at the time of filing, and/or as developed thereafter. In one embodiment, computing system implemented financial management system 180 is stored, in whole, or in part, in memory system 103, and is used by, or includes, or is accessed by, a process for predictive bill estimation, such as exemplary process 200 (FIG. 2) discussed below.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for predictive bill estimation and/or a computing system implemented financial management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, computing system 100 is a computing system accessible by one or more contributing consumers and/or user consumers and used, and/or accessible, by another computing system, such as computing system 150 (discussed below). Computing systems 100 and 150 can be any computing system as defined herein and/or as known in the art at the time of filing and/or as developed thereafter, that includes components that can execute all, or part, of a process for predictive bill estimation, and/or a computing system implemented financial management system, in accordance with at least one of the embodiments as described herein.

In one embodiment, computing system 100 is used, controlled, and/or accessible by, a provider of and/or a system and process for predictive bill estimation and data representing all, or part, of financial data associated with one or more contributing consumers is stored in computing system 100, typically in accounts associated with a given contributing consumer. In one embodiment, computing system 100 is used, controlled, and/or accessible by, a provider of and/or a computing system implemented financial management system and data representing all, or part, of financial data associated with one or more contributing consumers is stored in computing system 100, typically in accounts associated with a given contributing consumer.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 is used, controlled, and/or accessible by one or more user consumers and used, and/or accessible, by another computing system, such as computing system 100. In one embodiment, computing system 150 is used, controlled, and/or accessible by, a provider of and/or a system and process for predictive bill estimation and data representing all, or part, of data associated with one or more user and/or contributing consumers is stored in computing system 150, typically in accounts associated with a given consumer. In one embodiment, computing system 150 is used, controlled, and/or accessible by, a provider of and/or a computing system implemented financial management system and data representing all, or part, of financial data associated with one or more user and/or contributing consumers is stored in computing system 150, typically in accounts associated with a given consumer.

As discussed in more detail below, in one embodiment, all, or part of, a process for predictive bill estimation, and/or a computing system implemented financial management system, can also be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of a contributing consumer, and/or the contributing consumer's agents, a user consumer, and/or the user consumer's agents, and/or a process for predictive bill estimation, and/or a computing system implemented financial management system.

In one embodiment, database 170 is used, controlled, and/or accessible by, a provider of and/or a system and process for predictive bill estimation and data representing all, or part, of financial data associated with one or more contributing consumers is stored in database 170 (FIG. 1). In one embodiment, database 170 is used, controlled, and/or accessible by, a provider of and/or a computing system implemented financial management system and data representing all, or part, of financial data associated with one or more contributing consumers is stored in database 170.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for predictive bill estimation and data representing all, or part, of financial data associated with one or more contributing consumers is stored in server system 120. In one embodiment, server system 120 is used, controlled, and/or accessible by, a provider of and/or a computing system implemented financial management system and data representing all, or part, of financial data associated with one or more contributing consumers is stored in server system 120.

Network 130 can be any network or network system as defined herein, known in the art at the time of filing, and/or as developed after the time of filing, capable of allowing communication between two or more computing systems.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for predictive bill estimation, and/or a computing system implemented financial management system, and/or financial data associated with one or more contributing consumers, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for predictive bill estimation, and/or a computing system implemented financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for predictive bill estimation and/or a computing system implemented financial management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for predictive bill estimation, and/or a computing system implemented financial management system, and/or financial data associated with one or more contributing consumers, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the term "contributing consumer", denotes any party and/or entity for whom, or from whom, financial data is obtained by a process for predictive bill estimation, and/or a person and/or entity for whom, or from whom, financial data is obtained by a process for predictive bill estimation, and/or a legal guardian of person and/or entity for whom, or from whom, financial data is obtained by a process for predictive bill estimation, and/or an authorized agent of any party and/or person and/or entity for whom, or from whom, financial data is obtained by a process for predictive bill estimation.

Herein, the term "user consumer" and "user" are used interchangeably to denote any party and/or entity that interfaces with, and/or to whom information is provided by, a process for predictive bill estimation, and/or a person and/or entity that interfaces with, and/or to whom information is provided by, a process for predictive bill estimation, and/or a legal guardian of person and/or entity that interfaces with, and/or to whom information is provided by, a process for predictive bill estimation, and/or an authorized agent of any party and/or person and/or entity that interfaces with, and/or to whom information is provided by, a process for predictive bill estimation.

As used herein, the term "product" and "product and/or service" are used interchangeably to denote a product, a service, or both a product and a service, or multiple products and/or services that can be purchased and/or otherwise obtained by a contributing consumer and/or a user consumer.

As used herein, the term "bill", "cost/bill" and "recurring cost" are used interchangeably to denote a recurring cost to a consumer. Herein a recurring cost is any cost that occurs on a periodic basis whether the period is daily, weekly, monthly, quarterly, semiannually, annually, bi-annually, or at an other more or less regular interval.

As used herein, the term computing system, denotes, but is not limited to: a portable computer; a workstation; a two-way pager; a cellular telephone; a smart phone; a digital wireless telephone; a Personal Digital Assistant (PDA); a media player, i.e., an MP3 Player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term computing system implemented financial management system includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filing or as developed later.

As used herein, the term "network" is used to demote any network or network system that is of interest such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to a data storage means that is part of, or under the control of, any computing system, as defined, known at the time of filing, or as developed thereafter.

In accordance with one embodiment, a system and method for predictive bill estimation includes a process for predictive bill estimation whereby financial data associated with one or more "contributing consumers" is obtained from one or more sources. In one embodiment, the contributing consumers agree to share the financial data with other "user consumers". In one embodiment, the financial data includes data associated with specific financial transactions and, in one embodiment, the specific financial transactions are tagged as sharable by the contributing consumers. In one embodiment, the financial data is categorized by the contributing consumers and, in one embodiment, multiple financial transactions are associated with a specific expense category by the contributing consumers. In one embodiment, the financial data obtained from the one or more contributing consumers is then aggregated, analyzed, and/or categorized, according to one or more criteria/parameters associated with the financial transaction data and/or the contributing consumer. In one embodiment, the aggregated and/or categorized financial data is then stored by the process for predictive bill estimation. In one embodiment, a user consumer then initiates a request for cost/bill data associated with a given area and/or event. In one embodiment, the aggregated and/or categorized financial data obtained from one or more contributing consumers is then searched based on one or more search parameters and results data representing multiple financial transactions and/or purchases associated the specified area and/or event and/or time frame is obtained. In one embodiment, the results data obtained is then presented to the user consumer in any one of various data and/or report formats, and, in one embodiment, the user consumer is notified/alerted to predicted fluctuations in his or her bills automatically well in advance of the expected fluctuation in order to provide the user consumer the opportunity to budget for the predicted fluctuations.

Figure 2:
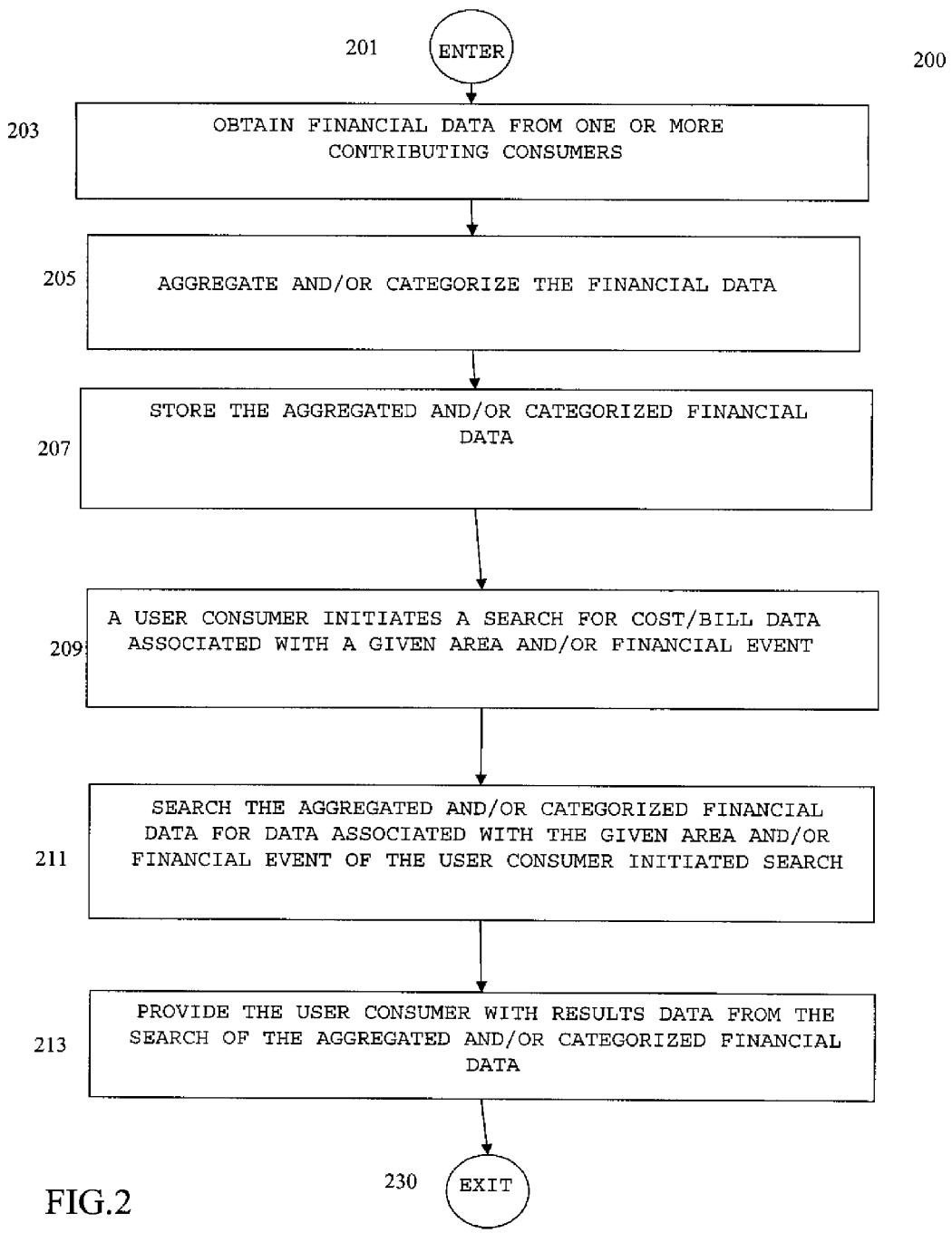
FIG. 2 is a flow chart depicting a process for predictive bill estimation in accordance with one embodiment.

FIG. 2 is a flow chart depicting a process for predictive bill estimation 200 in accordance with one embodiment. Process for predictive bill estimation 200 begins at ENTER OPERATION 201 of FIG. 2 and process flow proceeds to OBTAIN FINANCIAL DATA FROM ONE OR MORE CONTRIBUTING CONSUMERS OPERATION 203.

In one embodiment, at OBTAIN FINANCIAL DATA FROM ONE OR MORE CONTRIBUTING CONSUMERS OPERATION 203 financial data associated with one or more "contributing consumers" is obtained from one or more sources.

In one embodiment, at OBTAIN FINANCIAL DATA FROM ONE OR MORE CONTRIBUTING CONSUMERS OPERATION 203 the contributing consumers agree to share the financial data with other "user consumers" by any one of various means, including, tagging specific financial data as sharable data. In one embodiment, the financial data includes data associated with specific financial transactions and, in one embodiment, the specific financial transactions are tagged as sharable by the contributing consumers. In one embodiment, the specific financial transactions are categorized by the contributing consumers and/or associated with a specific type of expense.

In one embodiment, at OBTAIN FINANCIAL DATA FROM ONE OR MORE CONTRIBUTING CONSUMERS OPERATION 203, the financial data obtained from one or more contributing consumers includes general financial data obtained from the contributing consumer representing a given contributing consumer's general and/or overall financial status and/or demographics, including, but not limited to: the contributing consumer's area of residence/zip code; the contributing consumer's total assets; details regarding one or more of the contributing consumer's assets, such as the size and location of the contributing consumer's house and/or the type of car the contributing consumer drives; the contributing consumer's total income and/or the percentage of the contributing consumer's income spent in a given category of financial data; the contributing consumer's net worth; the contributing consumer's average discretionary spending and/or the percentage of the contributing consumer's discretionary spending spent in a given category of financial data; the contributing consumer's age group; various demographic data regarding the contributing consumer and/or the contributing consumer's spending; the contributing consumer's marital status and/or number of dependents; the contributing consumer's commute; the contributing consumer's yearly mileage; the contributing consumer's commute profession; and/or any other data regarding the contributing consumer's general and/or overall financial status desired and/or available.

In one embodiment, as discussed below, the contributing consumer's general and/or overall financial status and/or demographics data is used to categorize and/or identify contributing consumers, and their shared financial data, according to various criteria/parameters so that, in one embodiment, process for predictive bill estimation 200 can find financial data from contributing consumer similarly situated with a given user consumer. In one embodiment, as discussed below, the contributing consumer's general and/or overall financial status and/or demographics data is used to categorize and/or identify contributing consumers, and their shared financial data according to various criteria/parameters so that a user consumer can narrow search results to results from specific "types" of contributing consumers.

In one embodiment, at OBTAIN FINANCIAL DATA FROM ONE OR MORE CONTRIBUTING CONSUMERS OPERATION 203 the financial data associated with one or more contributing consumers represents various financial transactions conducted by a given contributing consumer. In one embodiment, at OBTAIN FINANCIAL DATA FROM ONE OR MORE CONTRIBUTING CONSUMERS OPERATION 203 the financial data representing various financial transactions conducted by the contributing consumer includes, but is not limited to, data representing: dates of specific financial transactions; payees/payers associated with specific financial transactions; categories of specific financial transactions, such as the expense category assigned to a given specific financial transaction; total expenditures in specific financial transaction categories over designated time frames; specific items purchased through specific financial transactions; the geographic location of specific financial transactions; the geographic location where one or more services and/or products associated with specific financial transactions are used/delivered; and/or any other data regarding specific financial transactions desired and/or available.

In one embodiment, at OBTAIN FINANCIAL DATA FROM ONE OR MORE CONTRIBUTING CONSUMERS OPERATION 203 at least part of the financial data associated with one or more contributing consumers is obtained by process for predictive bill estimation 200 using, and/or through, and/or from, a computing system implemented financial management system.

In one embodiment, the financial data associated with one or more contributing consumers obtained at OBTAIN FINANCIAL DATA FROM ONE OR MORE CONTRIBUTING CONSUMERS OPERATION 203 includes data associated with financial transactions conducted using multiple payment methods and/or accounts to provide as complete a set of contributing consumer financial data as possible. For instance, in one embodiment, the financial data associated with one or more contributing consumers is obtained at OBTAIN FINANCIAL DATA FROM ONE OR MORE CONTRIBUTING CONSUMERS OPERATION 203 from, but not limited to, any one or more of the following sources: banks; debit cards and/or accounts; credit unions; credit cards and/or accounts and/or credit card/account providers; asset accounts and/or asset account providers; a user controlled computing system implemented financial management system; or other financial resources, accounts and/or services used by a contributing consumer to pay for and/or conduct financial transactions.

In addition, in some embodiments, the financial data associated with one or more contributing consumers obtained at OBTAIN FINANCIAL DATA FROM ONE OR MORE CONTRIBUTING CONSUMERS OPERATION 203 is obtained from multiple sources of the same type. For instance, in one embodiment, the financial data associated with one or more contributing consumers is obtained at OBTAIN FINANCIAL DATA FROM ONE OR MORE CONTRIBUTING CONSUMERS OPERATION 203 from: two or more banks; two or more debit cards and/or accounts; two or more credit unions; two or more credit cards and/or accounts and/or credit card/account providers; two or more asset accounts and/or asset account providers; two or more user controlled computing system implemented financial management systems; and/or two or more other financial resources, accounts and/or services used by a contributing consumer to pay for and/or conduct financial transactions.

As noted above, in one embodiment, all, or part, of the financial data associated with one or more contributing consumers is obtained by process for predictive bill estimation 200 at OBTAIN FINANCIAL DATA FROM ONE OR MORE CONTRIBUTING CONSUMERS OPERATION 203 from, or using, a computing system implemented financial management system, such as computing system implemented financial management system 180 (FIG. 1), that implements, includes, is accessed by, and/or is otherwise associated with process for predictive bill estimation 200 (FIG. 2).

Currently, various computing system implemented financial management systems are available as defined herein. Computing system implemented financial management systems typically help users/contributing consumers manage their finances by providing a centralized interface with banks, credit card companies, and other various financial institutions and/or accounts, for identifying, processing, storing, and categorizing user/contributing consumer financial transactions and other contributing consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification or various other systems for transferring financial transaction data.

As noted above, using computing system implemented financial management systems, the financial transaction information, user defined category of the financial transaction, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular categories, associated with one or more particular products and/or services, and/or with one or more particular payees, and/or one or more specific events.

In one embodiment, the financial data associated with one or more contributing consumers obtained using one or more computing system implemented financial management systems is transferred, or otherwise made available to, process for predictive bill estimation 200 at OBTAIN FINANCIAL DATA FROM ONE OR MORE CONTRIBUTING CONSUMERS OPERATION 203.

In one embodiment, all, or part, of the financial data associated with one or more contributing consumers is obtained by process for predictive bill estimation 200 at OBTAIN FINANCIAL DATA FROM ONE OR MORE CONTRIBUTING CONSUMERS OPERATION 203 from invoices/bills and/or receipt data provided to process for predictive bill estimation 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for predictive bill estimation 200 is associated with a computing system implemented financial management system, such as computing system implemented financial management system 180 of FIG. 1, that implements, includes, is accessed by, and/or is otherwise associated with process for predictive bill estimation 200 (FIG. 2). Some of these computing system implemented financial management systems provide the capability to obtain, receive, and/or process electronic copies of the invoices/receipts from one or more merchants and/or product and/or service providers, often in their specific formats, and then process and/or store the data for use by process for predictive bill estimation 200 in one of numerous locations by one of numerous methods known to those of skill in the art and/or as discussed herein.

In one embodiment, all, or part, of the financial data associated with one or more contributing consumers is obtained by process for predictive bill estimation 200, and/or a computing system implemented financial management system, at OBTAIN FINANCIAL DATA FROM ONE OR MORE CONTRIBUTING CONSUMERS OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a contributing consumer to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a contributing consumer to pay for and/or conduct financial transactions.

In one embodiment, all, or part, of the financial data associated with one or more contributing consumers is obtained by process for predictive bill estimation 200 at OBTAIN FINANCIAL DATA FROM ONE OR MORE CONTRIBUTING CONSUMERS OPERATION 203 from contributing consumer input through a user interface device such as keyboard 107, 157, mouse 111, 161 of FIG. 1 or a touchpad, voice recognition system, or any other device capable of providing user input to a computing system and/or for translating user actions into computing system operations, whether available or known at the time of filing or as developed later.

Returning to FIG. 2, in one embodiment, all, or part, of the financial data associated with one or more contributing consumers is obtained by process for predictive bill estimation 200 at OBTAIN FINANCIAL DATA FROM ONE OR MORE CONTRIBUTING CONSUMERS OPERATION 203 from any combination of the above sources and/or from any other source of financial data associated with one or more contributing consumers whether known at the time of filing or as developed thereafter.

In one embodiment, at OBTAIN FINANCIAL DATA FROM ONE OR MORE CONTRIBUTING CONSUMERS OPERATION 203 the contributing consumers agree to share all or part of their financial data with process for predictive bill estimation 200 and "user consumers" by any one of various means, including, tagging specific financial data as sharable data.

In one embodiment, at OBTAIN FINANCIAL DATA FROM ONE OR MORE CONTRIBUTING CONSUMERS OPERATION 203 the contributing consumers agree to share the financial data with user consumers on a transaction-by-transaction approval basis. In one embodiment, at OBTAIN FINANCIAL DATA FROM ONE OR MORE CONTRIBUTING CONSUMERS OPERATION 203, the contributing consumers agree to share the financial data with user consumers on a financial data category approval basis. In one embodiment, at OBTAIN FINANCIAL DATA FROM ONE OR MORE CONTRIBUTING CONSUMERS OPERATION 203 the contributing consumers agree to share the financial data with user consumers without restriction. In other embodiments, at OBTAIN FINANCIAL DATA FROM ONE OR MORE CONTRIBUTING CONSUMERS OPERATION 203 the contributing consumers agree to share the financial data with user consumers based on any restrictions/criteria dictated by the contributing consumer.

In one embodiment, at OBTAIN FINANCIAL DATA FROM ONE OR MORE CONTRIBUTING CONSUMERS OPERATION 203, the financial data to be shared is tagged as sharable by the contributing consumers using a user interface display and a user interface device, such as those defined herein, known in the art, or developed after the time of filing.

In one embodiment, at OBTAIN FINANCIAL DATA FROM ONE OR MORE CONTRIBUTING CONSUMERS OPERATION 203, specific financial transaction data is assigned a category/name and/or a description by the contributing consumer and one or more specific financial transactions are associated by the contributing consumer with a specific type of expense, such as utilities, or home maintenance, or transportation. In one embodiment, at OBTAIN FINANCIAL DATA FROM ONE OR MORE CONTRIBUTING CONSUMERS OPERATION 203, specific financial transaction data is assigned a category/name and/or a description by the contributing consumer and one or more given financial transactions are associated by the contributing consumer with a specific purchase or payment.

In one embodiment, at OBTAIN FINANCIAL DATA FROM ONE OR MORE CONTRIBUTING CONSUMERS OPERATION 203, specific financial transaction data is assigned a category/name and/or a description by the contributing consumer and a given financial transaction category, including one or more specific financial transactions, is associated by the contributing consumer with a specific type of expense, such as utilities, or home maintenance, or transportation. In one embodiment, at OBTAIN FINANCIAL DATA FROM ONE OR MORE CONTRIBUTING CONSUMERS OPERATION 203, specific financial transaction data is assigned a category/name and/or a description by the contributing consumer and a given financial transaction category, including one or more specific financial transactions, is associated by the contributing consumer with a specific purchase of a product and/or service.

In one embodiment, once the financial data associated with one or more contributing consumers is obtained at OBTAIN FINANCIAL DATA FROM ONE OR MORE CONTRIBUTING CONSUMERS OPERATION 203, process flow proceeds to AGGREGATE AND/OR CATEGORIZE THE FINANCIAL DATA OPERATION 205.

In one embodiment, at AGGREGATE AND/OR CATEGORIZE THE FINANCIAL DATA OPERATION 205 the financial data obtained from one or more contributing consumers at OBTAIN FINANCIAL DATA FROM ONE OR MORE CONTRIBUTING CONSUMERS OPERATION 203 is aggregated, analyzed, and/or categorized, according to one or more criteria/parameters associated with the financial transaction data and/or the contributing consumer.

In one embodiment, at AGGREGATE AND/OR CATEGORIZE THE FINANCIAL DATA OPERATION 205 the financial data obtained from one or more contributing consumers at OBTAIN FINANCIAL DATA FROM ONE OR MORE CONTRIBUTING CONSUMERS OPERATION 203 is categorized, and/or re-categorized as determined by process for predictive bill estimation 200.

In one embodiment, at AGGREGATE AND/OR CATEGORIZE THE FINANCIAL DATA OPERATION 205 the financial data obtained from one or more contributing consumers at OBTAIN FINANCIAL DATA FROM ONE OR MORE CONTRIBUTING CONSUMERS OPERATION 203 is aggregated, analyzed, and/or categorized, according to: the contributing consumer assigned category; and/or the process for predictive bill estimation 200 assigned category; and/or a computing system implemented financial management system assigned category, associated with the financial data.

In one embodiment, at AGGREGATE AND/OR CATEGORIZE THE FINANCIAL DATA OPERATION 205 the financial data obtained from one or more contributing consumers at OBTAIN FINANCIAL DATA FROM ONE OR MORE CONTRIBUTING CONSUMERS OPERATION 203 is aggregated, analyzed, and/or categorized, according to: the contributing consumer assigned category; and/or the process for predictive bill estimation 200 assigned category; and/or the computing system implemented financial management system category, associated with the financial data and one or more parameters associated with the contributing consumer.

In one embodiment, the one or more parameters associated with the contributing consumer include, but are not limited to, one or more of the following: the contributing consumer's area of residence/zip code; the contributing consumer's total assets; details regarding one or more of the contributing consumer's assets, such as the size and location of the contributing consumer's house and/or the type of car the contributing consumer drives; the contributing consumer's total income and/or the percentage of the contributing consumer's income spent in the category of the financial transaction data; the contributing consumer's net worth; the contributing consumer's average discretionary spending and/or the percentage of the contributing consumer's discretionary spending spent in the category of the financial transaction data; the contributing consumer's age group; various demographic data regarding the contributing consumer and/or the contributing consumer's spending; the contributing consumer's marital status and/or number of dependents; the contributing consumer's commute; the contributing consumer's yearly mileage; the contributing consumer's profession; and/or any other data regarding the contributing consumer's general and/or overall financial status desired and/or available and/or obtained at OBTAIN FINANCIAL DATA FROM ONE OR MORE CONTRIBUTING CONSUMERS OPERATION 203.

In one embodiment, at AGGREGATE AND/OR CATEGORIZE THE FINANCIAL DATA OPERATION 205 the financial data obtained from one or more contributing consumers at OBTAIN FINANCIAL DATA FROM ONE OR MORE CONTRIBUTING CONSUMERS OPERATION 203 is aggregated and/or categorized, and/or analyzed according to any criteria desired using any one the numerous methods for analyzing and aggregating data.

Methods, means, processes, procedures and mechanisms for analyzing, aggregating, and categorizing data according to various parameters/criteria as well known in the art. Consequently, a more detailed discussion of any specific methods, means, processes, procedures and mechanisms for analyzing, aggregating, and categorizing data, such as, in one embodiment, is performed at AGGREGATE AND/OR CATEGORIZE THE FINANCIAL DATA OPERATION 205, is omitted here to avoid detracting from the invention.

In one embodiment, once the financial data obtained from one or more contributing consumers at OBTAIN FINANCIAL DATA FROM ONE OR MORE CONTRIBUTING CONSUMERS OPERATION 203 is aggregated, analyzed, and/or categorized, at AGGREGATE AND/OR CATEGORIZE THE FINANCIAL DATA OPERATION 205, process flow proceeds to STORE THE AGGREGATED AND/OR CATEGORIZED FINANCIAL DATA OPERATION 207.

In one embodiment, at STORE THE AGGREGATED AND/OR CATEGORIZED FINANCIAL DATA OPERATION 207, the aggregated and/or categorized contributing consumer financial data of AGGREGATE AND/OR CATEGORIZE THE FINANCIAL DATA OPERATION 205 is stored by, or under the control of, process for predictive bill estimation 200.

In one embodiment, at STORE THE AGGREGATED AND/OR CATEGORIZED FINANCIAL DATA OPERATION 207, the aggregated and/or categorized contributing consumer financial data is stored in whole, or in part, in a database maintained by, accessible by, owned by, or otherwise related to: process for predictive bill estimation 200, and/or a provider of process for predictive bill estimation 200; a computing system implemented financial management system, and/or a provider of a computing system implemented financial management system; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the aggregated and/or categorized contributing consumer financial data stored as described above is maintained, in whole, or in part, by: process for predictive bill estimation 200, and/or a provider of process for predictive bill estimation 200; a computing system implemented financial management system, and/or a provider of a computing system implemented financial management system; a third party data storage institution; any third party service or institution; or any other parties. In one embodiment, access to the aggregated and/or categorized contributing consumer financial data is then provided to process for predictive bill estimation 200, and/or a computing system implemented financial management system, by providing access to the data and/or providing the data on a computer program product.

In one embodiment, once the aggregated and/or categorized contributing consumer financial data of AGGREGATE AND/OR CATEGORIZE THE FINANCIAL DATA OPERATION 205 is stored by, or under the control of, process for predictive bill estimation 200 at STORE THE AGGREGATED AND/OR CATEGORIZED FINANCIAL DATA OPERATION 207, process flow proceeds to A USER CONSUMER INITIATES A SEARCH FOR COST/BILL DATA ASSOCIATED WITH A GIVEN AREA AND/OR FINANCIAL EVENT OPERATION 209.

In one embodiment, at A USER CONSUMER INITIATES A SEARCH FOR COST/BILL DATA ASSOCIATED WITH A GIVEN AREA AND/OR FINANCIAL EVENT OPERATION 209 a "user consumer" initiates a request for cost/bill data associated with a specified area/location and/or event.

In one embodiment, at A USER CONSUMER INITIATES A SEARCH FOR COST/BILL DATA ASSOCIATED WITH A GIVEN AREA AND/OR FINANCIAL EVENT OPERATION 209 the user consumer initiates a request for financial data related to costs/bills associated with a specified area and/or event using a user interface display and a user interface device, such as defined herein, known in the art, and/or as developed after the time of filing. In one embodiment, at A USER CONSUMER INITIATES A SEARCH FOR COST/BILL DATA ASSOCIATED WITH A GIVEN AREA AND/OR FINANCIAL EVENT OPERATION 209 the user consumer initiates a request for financial data related to costs/bills associated with a specified area and/or event using a computing system, such as defined herein, known in the art, and/or as developed after the time of filing. In one embodiment, at A USER CONSUMER INITIATES A SEARCH FOR COST/BILL DATA ASSOCIATED WITH A GIVEN AREA AND/OR FINANCIAL EVENT OPERATION 209 the user consumer initiates a request for financial data related to costs/bills associated with a specified area and/or event over a network such as defined herein, known in the art, and/or as developed after the time of filing.

In one embodiment, as part of the user consumer initiated request for cost/bill data associated with a specified area and/or event, the user consumer provides the identification data of a location such as a city, town, state, or region of interest. The specific location is identified using various data including, but not limited to: a common name; a postal code; a section of a city and/or town; a specific neighborhood in a city and/or town; nearby landmarks and/or known features; a specific block; a specific address; a GPS coordinate; a longitude and latitude; or any other means for identifying a location, known in the art, and/or as developed after the time of filing.

In one embodiment, as part of the user consumer initiated request for cost/bill data associated with a specified area and/or event, the user consumer identifies the proposed event such as, but not limited to: a move to the identified location; buying a house in the identified location; renting a house in the identified location; renting an apartment in the identified location; purchasing a product and/or service for use in the identified location; or any other specific event associated with the identified location.

In one embodiment, as part of the user consumer initiated request for cost/bill data associated with a specified area and/or event, the user consumer provides general financial data associated with the user consumer such as, but not limited to: the user consumer's total assets; details regarding one or more of the user consumer's assets, such as the size and location of the user consumer's house and/or the type of car the user consumer drives; the user consumer's total income and/or the percentage of the user consumer's income spent in a given category of financial data; the user consumer's net worth; the user consumer's average discretionary spending and/or the percentage of the user consumer's discretionary spending spent in a given category of financial data; the user consumer's age group; various demographic data regarding the user consumer and/or the user consumer's spending; the user consumer's marital status and/or number of dependents; the user consumer's expected commute; the user consumer's yearly mileage; the user consumer's profession; and/or any other data regarding the user consumer's general and/or overall financial status desired.

In one embodiment, the general financial data associated with the user consumer is obtained from one or more computing system implemented financial management systems associated with the user consumer.

In one embodiment, the general financial data associated with the user consumer is used to find contributor consumers, and contributor consumer financial data, most closely related to the user consumer's situation.

In one embodiment, as part of the user consumer initiated request for cost/bill data associated with a specified area and/or event, the user consumer provides search criteria and/or parameters such as a request to see all results from specific categories of contributing consumers, or from contributing consumers having specific financial and/or demographic attributes.

Recall that, in one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, the contributing consumer's general and/or overall financial status and/or demographics data is obtained. In one embodiment, at AGGREGATE AND/OR CATEGORIZE THE FINANCIAL DATA OPERATION 205, the contributing consumer's general and/or overall financial status and/or demographics data is used to categorize and/or identify contributing consumers, and/or their financial data contributed, according to various criteria. In one embodiment, at A USER CONSUMER INITIATES A SEARCH FOR COST/BILL DATA ASSOCIATED WITH A GIVEN AREA AND/OR FINANCIAL EVENT OPERATION 209 a user consumer can then narrow search results to results from specific "types" of contributing consumers with the specific types of contributing consumers being identified based on the contributing consumer's general and/or overall financial status and/or demographics data of OBTAIN FINANCIAL DATA FROM ONE OR MORE CONTRIBUTING CONSUMERS OPERATION 203 and the contributing consumer categorizations of AGGREGATE AND/OR CATEGORIZE THE FINANCIAL DATA OPERATION 205.

In one embodiment, once a user consumer initiates a request for financial data related to costs/bills associated with a specified area and/or event at A USER CONSUMER INITIATES A SEARCH FOR COST/BILL DATA ASSOCIATED WITH A GIVEN AREA AND/OR FINANCIAL EVENT OPERATION 209, process flow proceeds to SEARCH THE AGGREGATED AND/OR CATEGORIZED FINANCIAL DATA FOR DATA ASSOCIATED WITH THE GIVEN AREA AND/OR FINANCIAL EVENT OF THE USER CONSUMER INITIATED SEARCH OPERATION 211.

In one embodiment, at SEARCH THE AGGREGATED AND/OR CATEGORIZED FINANCIAL DATA FOR DATA ASSOCIATED WITH THE GIVEN AREA AND/OR FINANCIAL EVENT OF THE USER CONSUMER INITIATED SEARCH OPERATION 211 the aggregated and/or categorized contributing consumer financial data stored at STORE THE AGGREGATED AND/OR CATEGORIZED FINANCIAL DATA OPERATION 207 is searched and results data regarding cost/bills associated with the specified area and/or event of A USER CONSUMER INITIATES A SEARCH FOR COST/BILL DATA ASSOCIATED WITH A GIVEN AREA AND/OR. FINANCIAL EVENT OPERATION 209 is obtained.

In one embodiment, at SEARCH THE AGGREGATED AND/OR CATEGORIZED FINANCIAL DATA FOR DATA ASSOCIATED WITH THE GIVEN AREA AND/OR FINANCIAL EVENT OF THE USER CONSUMER INITIATED SEARCH OPERATION 211 the aggregated and/or categorized contributing consumer financial data is searched and search results data regarding cost/bills associated with the specified area and/or event, and/or most closely matching any user consumer search parameters and/or criteria of A USER CONSUMER INITIATES A SEARCH FOR COST/BILL DATA ASSOCIATED WITH A GIVEN AREA AND/OR FINANCIAL EVENT OPERATION 209, is obtained using any search method and/or search engine known in the art at the time of filing, or as developed after the time of filing.

In one embodiment, the search results data regarding cost/bills associated with the specified area and/or event includes data indicating all financial transactions, and therefore all bills and/or bill payments, associated with the specified area and/or event of the user consumer initiated search request.

Numerous, methods, means, mechanisms, processes and/or procedures for analyzing and/or searching data in response to various search criteria/parameters, are well known to those of skill in the art. Consequently, a more detailed discussion of methods, means, mechanisms, processes and/or procedures for analyzing and/or searching data in response to various search criteria/parameters, such as the analysis/search performed, in one embodiment, at SEARCH THE AGGREGATED AND/OR CATEGORIZED FINANCIAL DATA FOR DATA ASSOCIATED WITH THE GIVEN AREA AND/OR FINANCIAL EVENT OF THE USER CONSUMER INITIATED SEARCH OPERATION 211, is omitted here to avoid detracting from the invention.

In one embodiment, once the aggregated and/or categorized contributing consumer financial data stored at STORE THE AGGREGATED AND/OR CATEGORIZED FINANCIAL DATA OPERATION 207 is searched and results data regarding cost/bills associated with the specified area and/or event of A USER CONSUMER INITIATES A SEARCH FOR COST/BILL DATA ASSOCIATED WITH A GIVEN AREA AND/OR FINANCIAL EVENT OPERATION 209 is obtained at SEARCH THE AGGREGATED AND/OR CATEGORIZED FINANCIAL DATA FOR DATA ASSOCIATED WITH THE GIVEN AREA AND/OR FINANCIAL EVENT OF THE USER CONSUMER INITIATED SEARCH OPERATION 211, process flow proceeds to PROVIDE THE USER CONSUMER WITH RESULTS DATA FROM THE SEARCH OF THE AGGREGATED AND/OR CATEGORIZED FINANCIAL DATA OPERATION 213.

In one embodiment, at PROVIDE THE USER CONSUMER WITH RESULTS DATA FROM THE SEARCH OF THE AGGREGATED AND/OR CATEGORIZED FINANCIAL DATA OPERATION 213, the results data obtained at SEARCH THE AGGREGATED AND/OR CATEGORIZED FINANCIAL DATA FOR DATA ASSOCIATED WITH THE GIVEN AREA AND/OR FINANCIAL EVENT OF THE USER CONSUMER INITIATED SEARCH OPERATION 211 is presented to the user consumer in any one of various data and/or report formats.

In one embodiment, at PROVIDE THE USER CONSUMER WITH RESULTS DATA FROM THE SEARCH OF THE AGGREGATED AND/OR CATEGORIZED FINANCIAL DATA OPERATION 213 the search results data regarding cost/bills associated with the specified area and/or event, and/or most closely matching any user consumer search parameters and/or criteria of A USER CONSUMER INITIATES A SEARCH FOR COST/BILL DATA ASSOCIATED WITH A GIVEN AREA AND/OR FINANCIAL EVENT OPERATION 209, is presented to the user consumer as a listing of specific bills paid by the one or more contributor consumers associated with the specified area and/or event of the user consumer initiated search request.

In one embodiment, at PROVIDE THE USER CONSUMER WITH RESULTS DATA FROM THE SEARCH OF THE AGGREGATED AND/OR CATEGORIZED FINANCIAL DATA OPERATION 213 the search results data regarding cost/bills associated with the specified area and/or event, and/or most closely matching any user consumer search parameters and/or criteria of A USER CONSUMER INITIATES A SEARCH FOR COST/BILL DATA ASSOCIATED WITH A GIVEN AREA AND/OR FINANCIAL EVENT OPERATION 209, is presented to the user consumer as a listing of costs in specific categories paid by the one or more contributor consumers associated with the given area and/or event of the user consumer initiated search request. In this way, a user consumer can potentially see all bills, including bills associated with potentially hidden costs of which the user consumer may not have been aware absent process for predictive bill estimation 200.

In one embodiment, at PROVIDE THE USER CONSUMER WITH RESULTS DATA FROM THE SEARCH OF THE AGGREGATED AND/OR CATEGORIZED FINANCIAL DATA OPERATION 213, the search results data regarding cost/bills associated with the specified area and/or event, and/or most closely matching any user consumer search parameters and/or criteria of A USER CONSUMER INITIATES A SEARCH FOR COST/BILL DATA ASSOCIATED WITH A GIVEN AREA AND/OR FINANCIAL EVENT OPERATION 209, is presented to the user consumer as a listing of specific bills associated with the specified area and/or event of the user consumer initiated search request in a month-to-month comparison. In this way a user consumer can see all bills, including bills associated with potentially hidden costs the user consumer was not aware of, and potential monthly and/or seasonal fluctuations in those bills of which the user consumer may not have been aware absent process for predictive bill estimation 200.

In one embodiment, at PROVIDE THE USER CONSUMER WITH RESULTS DATA FROM THE SEARCH OF THE AGGREGATED AND/OR CATEGORIZED FINANCIAL DATA OPERATION 213, the user consumer is alerted to potential upcoming bills and/or bill fluctuations manually in response to a specific user consumer request. In one embodiment, at PROVIDE THE USER CONSUMER WITH RESULTS DATA FROM THE SEARCH OF THE AGGREGATED AND/OR CATEGORIZED FINANCIAL DATA OPERATION 213, the user consumer is shown results and/or alerted to potential upcoming bills and/or bill fluctuations, semi-automatically, or automatically, on a periodic basis. In one embodiment, at PROVIDE THE USER CONSUMER WITH RESULTS DATA FROM THE SEARCH OF THE AGGREGATED AND/OR CATEGORIZED FINANCIAL DATA OPERATION 213, the user consumer is shown results and/or alerted to potential upcoming bills and/or bill fluctuations, automatically on a periodic basis and well in advance of the predicted bills and/or bill fluctuations in order to provide the user consumer the opportunity to budget for the predicted fluctuations.

In one embodiment, at PROVIDE THE USER CONSUMER WITH RESULTS DATA FROM THE SEARCH OF THE AGGREGATED AND/OR CATEGORIZED FINANCIAL DATA OPERATION 213, the results data obtained at SEARCH THE AGGREGATED AND/OR CATEGORIZED FINANCIAL DATA FOR DATA ASSOCIATED WITH THE GIVEN AREA AND/OR FINANCIAL EVENT OF THE USER CONSUMER INITIATED SEARCH OPERATION 211 is presented to the user consumer in any one of various data and/or report formats using any of the means for data and/or information transfer discussed herein, known in the art, and/or as developed after the time of filing.

In one embodiment, once the results data obtained at SEARCH THE AGGREGATED AND/OR CATEGORIZED FINANCIAL DATA FOR DATA ASSOCIATED WITH THE GIVEN AREA AND/OR FINANCIAL EVENT OF THE USER CONSUMER INITIATED SEARCH OPERATION 211 is presented to the user consumer in any one of various data and/or report formats at PROVIDE THE USER CONSUMER WITH RESULTS DATA FROM THE SEARCH OF THE AGGREGATED AND/OR CATEGORIZED FINANCIAL DATA OPERATION 213, process flow proceeds to EXIT OPERATION 230. In one embodiment, at EXIT OPERATION 230, process for predictive bill estimation 200 is exited to await new data.

Using process for predictive bill estimation 200, a user consumer is provided the opportunity to see financial data associated with other consumer's and, in particular, see what bills and bill amounts are being paid by similarly situated consumers in a specific area/location. Consequently, using process for predictive bill estimation 200, a consumer can learn from the experience of other similar consumers and thereby more readily determine the actual bills, and fluctuations in the amount of those bills, that are associated with a given location and/or event. Therefore, using process for predictive bill estimation 200, the consumer is far less likely to be faced with unexpected costs associated with a move or other event.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing", "analyzing", "obtaining", "determining", "aggregating"; "initiating"; "collecting", "creating", "transferring", "storing", "searching", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG. s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computing system for predictive bill estimation comprising:

a processor; and a memory coupled to the processor, the memory having processor executable instructions stored therein which when executed by the processor, perform a process for predictive bill estimation comprising:

obtaining financial data from one or more contributing consumers, at least part of the financial data from the one or more contributing consumers representing recurring costs data, the financial data including a plurality of transactions from each of the one or more contributing consumers, each transaction within the plurality of transactions from each contributing consumer having been previously individually designated on a transaction by transaction basis by the respective contributing consumer as being sharable with a user consumer;

categorizing at least part of the financial data from the one or more contributing consumers at least according to a type of expense associated with the financial data;

aggregating at least part of the financial data from the one or more contributing consumers according to at least a location of residence of the contributing consumer providing the financial data;

storing the categorized and aggregated financial data from the one or more contributing consumers;

in response to a user consumer initiated search for recurring costs data associated with a given location, the user consumer initiated search for recurring cost data associated with a given location including the user consumer providing identification data for the given location and data identifying a specific event associated with the given location, searching the categorized and aggregated financial data from the one or more contributing consumers for categorized and aggregated financial data from the one or more contributing consumers representing recurring costs associated with the given location and any other data specified by the user consumer; and providing the user consumer results data comprising at least part of the categorized and aggregated financial data from the one or more contributing consumers representing recurring costs associated with the given location.

2. The computing system for predictive bill estimation of claim 1, wherein;

obtaining financial data from one or more contributing consumers, at least part of the financial data from one or more contributing consumers representing recurring costs data, comprises:
obtaining financial data from the one or more contributing consumers from a computing system implemented financial management system.

3. The computing system for predictive bill estimation of claim 1, wherein;
obtaining financial data from one or more contributing consumers, at least part of the financial data from one or more contributing consumers representing recurring costs data, comprises;
obtaining financial data representing specific financial transactions.

4. The computing system for predictive bill estimation of claim 1, wherein;
categorizing at least part of the financial data from the one or more contributing consumers at least according to a type of expense associated with the financial data is performed by the contributing consumers.

5. The computing system for predictive bill estimation of claim 1, wherein;
categorizing at least part of the financial data from the one or more contributing consumers at least according to a type of expense associated with the financial data is performed using a computing system implemented financial management system.

6. The computing system for predictive bill estimation of claim 1, wherein;
aggregating at least part of the financial data from the one or more contributing consumers according to at least a location of residence of the contributing consumer providing the financial data comprises:
aggregating at least part of the financial data from the one or more contributing consumers according to a location of residence of the contributing consumer providing the financial data and at least one of the following additional contributing consumer parameters chosen from the group of contributing consumer parameters consisting of:
the contributing consumer's total assets;
details regarding one or more of the contributing consumer's assets;
the contributing consumer's total income;
the percentage of the contributing consumer's income spent in the category of the financial data;
the contributing consumer's net worth;
the contributing consumer's average discretionary spending;
the percentage of the contributing consumer's discretionary spending spent in the category of the financial data;
the contributing consumer's age group;
the contributing consumer's marital status;
the contributing consumer's number of dependents;
the contributing consumer's commute;
the contributing consumer's yearly mileage; and
the contributing consumer's profession.

7. The computing system for predictive bill estimation of claim 1, wherein;
the user consumer initiated search for recurring cost data associated with a given location includes the user consumer providing general financial data associated with the user consumer, the general financial data associated with the user consumer being chosen from the group of general financial data associated with the user consumer consisting of:
the user consumer's total assets;
details regarding one or more of the user consumer's assets;
the user consumer's total income;
the percentage of the user consumer's income spent in the category of the financial data;
the user consumer's net worth;
the user consumer's average discretionary spending;
the percentage of the user consumer's discretionary spending spent in a given category of expense;
the user consumer's age group;
the user consumer's marital status;
the user consumer's number of dependents;
the user consumer's commute;
the user consumer's yearly mileage; and
the user consumer's profession.

8. The computing system for predictive bill estimation of claim 1, wherein;
the specific event associated with the given location includes a specific event associated with the given location chosen from the group of events associated with the given location consisting of:
a move to the given location;
buying a house in the given location;
renting a house in the given location;
renting an apartment in the given location; and
purchasing a product for use in the given location.

9. The computing system for predictive bill estimation of claim 1, wherein;
the user consumer initiated search for recurring cost data associated with a given location includes the user consumer providing user consumer search parameters for searching the categorized and aggregated financial data from the one or more contributing consumers for categorized and aggregated financial data from contributing consumers having specific contributing consumer attributes, one or more of the specific contributing consumer attributes being chosen from the group of specific contributing consumer attributes consisting of:
contributing consumer's having total assets within a range defined by the user consumer;
contributing consumer's having total income within a range defined by the user consumer;
contributing consumer's having income spent in the category of the financial data within a range defined by the user consumer;
contributing consumer's having a net worth within a range defined by the user consumer;
contributing consumer's having average discretionary spending within a range defined by the user consumer;
contributing consumer's being in an age group defined by user consumer;
contributing consumer's having a user consumer defined marital status;
contributing consumer's having a number of dependents within a range defined by the user consumer;
contributing consumer's having a commute within a range defined by the user consumer;
contributing consumer's having yearly mileage within a range defined by the user consumer; and
contributing consumer's being of a user consumer defined profession.

10. The computing system for predictive bill estimation of claim 1, wherein;
providing the user consumer results data comprising at least part of the categorized and aggregated financial data from the one or more contributing consumers representing recurring costs associated with the given location comprises;
providing the user consumer results data comprising at least part of the categorized and aggregated financial data from the one or more contributing consumers representing recurring costs associated with the given location as a listing of all recurring costs associated with the given location for a given time frame found as a result of the search of the categorized and aggregated financial data from the one or more contributing consumers for categorized and aggregated financial data from the one or more contributing consumers representing recurring costs associated with the given location.

11. The computing system for predictive bill estimation of claim 1, wherein;
providing the user consumer results data comprising at least part of the categorized and aggregated financial data from the one or more contributing consumers representing recurring costs associated with the given location comprises:
providing the user consumer with alerts regarding specific recurring costs that are estimated to fluctuate over a given time frame that are identified, at least in part, as a result of the search of the categorized and aggregated financial data from the one or more contributing consumers for categorized and aggregated financial data from the one or more contributing consumers representing recurring costs associated with the given location.

12. The computing system for predictive bill estimation of claim 11, wherein;
providing the user consumer with alerts regarding specific recurring costs that are estimated to fluctuate over a given time frame comprises providing the user consumer with alerts regarding specific recurring costs that are estimated to fluctuate over a given time frame at least fifteen days before the estimated fluctuation in the specific recurring costs.

13. The computing system for predictive bill estimation of claim 1, wherein;
aggregating at least part of the financial data from the one or more contributing consumers according to at least a location of residence of the contributing consumer providing the financial data comprises:
aggregating at least part of the financial data from the one or more contributing consumers according to a location of residence of the contributing consumer providing the financial data and at least one additional contributing consumer parameter provided by one or more of the one or more contributing consumers, wherein the system is operable to aggregate according to each of the following contributing consumer parameters, if provided by the one or more of the one or more of the contributing consumers:
the contributing consumer's total assets;
details regarding one or more of the contributing consumer's assets;
the contributing consumer's total income;
the percentage of the contributing consumer's income spent in the category of the financial data;
the contributing consumer's net worth;
the contributing consumer's average discretionary spending;
the percentage of the contributing consumer's discretionary spending spent in the category of the financial data;
the contributing consumer's age group;
the contributing consumer's marital status;
the contributing consumer's number of dependents;
the contributing consumer's commute;
the contributing consumer's yearly mileage; and
the contributing consumer's profession;
and further wherein the any other data specified by the user consumer comprises a user consumer attribute which is matched against at least one of the at least one additional contributing consumer parameters prior to the associated contributing consumers' financial data being included in the user consumer results data.

14. A computer program product for providing a process for predictive bill estimation comprising:
a nontransitory computer readable medium;
and computer program code, encoded on the computer readable medium, comprising computer readable instructions for:
obtaining financial data from one or more contributing consumers, at least part of the financial data from the one or more contributing consumers representing recurring costs data, the financial data including a plurality of transactions from each of the one or more contributing consumers, each transaction within the plurality of transactions from each contributing consumer having been previously individually designated on a transaction by transaction basis by the respective contributing consumer as being sharable with a user consumer;
categorizing at least part of the financial data from the one or more contributing consumers at least according to a type of expense associated with the financial data;
aggregating at least part of the financial data from the one or more contributing consumers according to at least a location of residence of the contributing consumer providing the financial data;
storing the categorized and aggregated financial data from the one or more contributing consumers;
in response to a user consumer initiated search for recurring costs data associated with a given location, the user consumer initiated search for recurring cost data associated with a given location including the user consumer providing identification data for the given location and data identifying a specific event associated with the given location, searching the categorized and aggregated financial data from the one or more contributing consumers for categorized and aggregated financial data from the one or more contributing consumers representing recurring costs associated with the given location and any other data specified by the user consumer; and
providing the user consumer results data comprising at least part of the categorized and aggregated financial data from the one or more contributing consumers representing recurring costs associated with the given location.

15. The computer program product for providing a process for predictive bill estimation of claim 14, wherein;
obtaining financial data from one or more contributing consumers, at least part of the financial data from one or more contributing consumers representing recurring costs data, comprises:
obtaining financial data from the one or more contributing consumers from a computing system implemented financial management system.

16. The computer program product for providing a process for predictive bill estimation of claim 14, wherein;

obtaining financial data from one or more contributing consumers, at least part of the financial data from one or more contributing consumers representing recurring costs data, comprises;

obtaining financial data representing specific financial transactions.

17. The computer program product for providing a process for predictive bill estimation of claim 14, wherein;

categorizing at least part of the financial data from the one or more contributing consumers at least according to a type of expense associated with the financial data is performed by the contributing consumers.

18. The computer program product for providing a process for predictive bill estimation of claim 14, wherein;

categorizing at least part of the financial data from the one or more contributing consumers at least according to a type of expense associated with the financial data is performed using a computing system implemented financial management system.

19. The computer program product for providing a process for predictive bill estimation of claim 14, wherein;

aggregating at least part of the financial data from the one or more contributing consumers according to at least a location of residence of the contributing consumer providing the financial data comprises:

aggregating at least part of the financial data from the one or more contributing consumers according to a location of residence of the contributing consumer providing the financial and at least one of the following additional contributing consumer parameters chosen from the group of contributing consumer parameters consisting of:

the contributing consumer's total assets;

details regarding one or more of the contributing consumer's assets;

the contributing consumer's total income;

the percentage of the contributing consumer's income spent in the category of the financial data;

the contributing consumer's net worth;

the contributing consumer's average discretionary spending;

the percentage of the contributing consumer's discretionary spending spent in the category of the financial data;

the contributing consumer's age group;

the contributing consumer's marital status;

the contributing consumer's number of dependents;

the contributing consumer's commute;

the contributing consumer's yearly mileage; and the contributing consumer's profession.

20. The computer program product for providing a process for predictive bill estimation of claim 14, wherein;

the user consumer initiated search for recurring cost data associated with a given location includes the user consumer providing general financial data associated with the user consumer, the general financial data associated with the user consumer being chosen from the group of general financial data associated with the user consumer consisting of:

the user consumer's total assets;

details regarding one or more of the user consumer's assets;

the user consumer's total income;

the percentage of the user consumer's income spent in the category of the financial data;

the user consumer's net worth;

the user consumer's average discretionary spending;

the percentage of the user consumer's discretionary spending spent in a given category of expense;

the user consumer's age group;

the user consumer's marital status;

the user consumer's number of dependents;

the user consumer's commute;

the user consumer's yearly mileage; and the user consumer's profession.

21. The computer program product for providing a process for predictive bill estimation of claim 14, wherein;

the specific event associated with the given location includes a specific event associated with the given location chosen from the group of events associated with the given location consisting of:

a move to the given location;

buying a house in the given location;

renting a house in the given location;

renting an apartment in the given location; and purchasing a product for use in the given location.

22. The computer program product for providing a process for predictive bill estimation of claim 14, wherein;

the user consumer initiated search for recurring cost data associated with a given location includes the user consumer providing user consumer search parameters for searching the categorized and aggregated financial data from the one or more contributing consumers for categorized and aggregated financial data from contributing consumers having specific contributing consumer attributes, one or more of the specific contributing consumer attributes being chosen from the group of specific contributing consumer attributes consisting of:

contributing consumer's having total assets within a range defined by the user consumer;

contributing consumer's having total income within a range defined by the user consumer;

contributing consumer's having income spent in the category of the financial data within a range defined by the user consumer;

contributing consumer's having a net worth within a range defined by the user consumer;

contributing consumer's having average discretionary spending within a range defined by the user consumer;

contributing consumer's being in an age group defined by user consumer;

contributing consumer's having a user consumer defined marital status;

contributing consumer's having a number of dependents within a range defined by the user consumer;

contributing consumer's having a commute within a range defined by the user consumer;

contributing consumer's having yearly mileage within a range defined by the user consumer; and contributing consumer's being of a user consumer defined profession.

23. The computer program product for providing a process for predictive bill estimation of claim 14, wherein;

providing the user consumer results data comprising at least part of the categorized and aggregated financial data from the one or more contributing consumers representing recurring costs associated with the given location comprises;

providing the user consumer results data comprising at least part of the categorized and aggregated financial data from the one or more contributing consumers representing recurring costs associated with the given location as a listing of all recurring costs associated with the given location for a given time frame found as a result of the search of the categorized and aggregated financial data from the one or more contributing consumers for categorized and aggregated financial data from the one or more contributing consumers representing recurring costs associated with the given location.

24. The computer program product for providing a process for predictive bill estimation of claim 14, wherein;
providing the user consumer results data comprising at least part of the categorized and aggregated financial data from the one or more contributing consumers representing recurring costs associated with the given location comprises:
providing the user consumer with alerts regarding specific recurring costs that are estimated to fluctuate over a given time frame that are identified, at least in part, as a result of the search of the categorized and aggregated financial data from the one or more contributing consumers for categorized and aggregated financial data from the one or more contributing consumers representing recurring costs associated with the given location.

25. The computer program product for providing a process for predictive bill estimation of claim 24, wherein;
providing the user consumer with alerts regarding specific recurring costs that are estimated to fluctuate over a given time frame comprises providing the user consumer with alerts regarding specific recurring costs that are estimated to fluctuate over a given time frame at least fifteen days before the estimated fluctuation in the specific recurring costs.

* * * * *